Jan. 19, 1937.　　　P. E. DODGE　　　2,068,166

WELDING APPARATUS

Filed Sept. 28, 1934　　　2 Sheets-Sheet 1

Inventor:
PAUL E. DODGE

By Thos. S. Donnelly
Attorney.

Jan. 19, 1937.  P. E. DODGE  2,068,166
WELDING APPARATUS
Filed Sept. 28, 1934    2 Sheets-Sheet 2
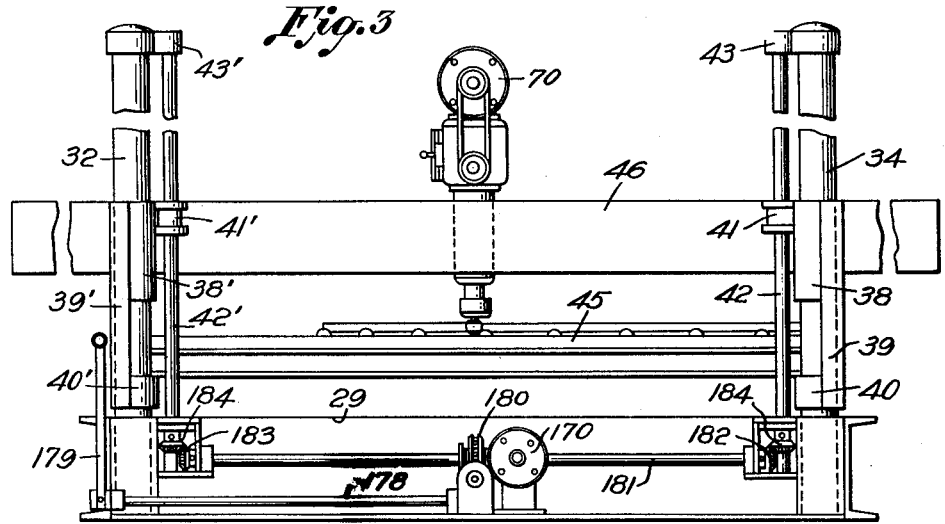
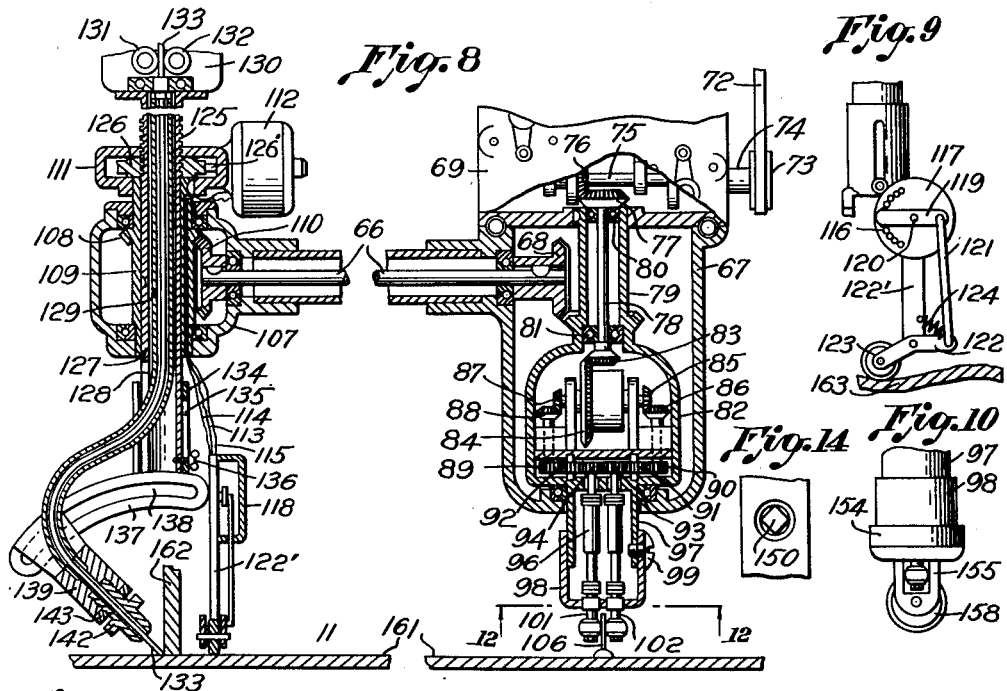
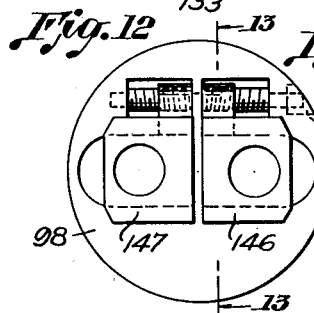
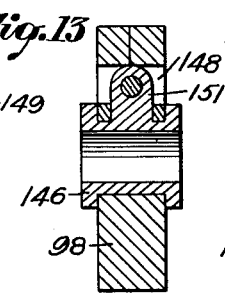
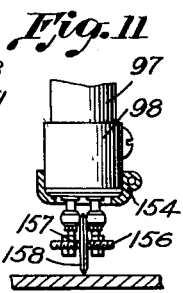
Inventor:
PAUL E. DODGE
By Thos. L. Donnelly
Attorney Patented Jan. 19, 1937

2,068,166

UNITED STATES PATENT OFFICE 2,068,166

WELDING APPARATUS

Paul E. Dodge, Detroit, Mich.

Application September 28, 1934, Serial No. 745,903

8 Claims. (Cl. 219—8)

My invention relates to a new and useful improvement in a cutting and welding apparatus in which a thermal metal working tool, such as a cutting torch or a welding head, is used and directed, in its use, to travel over a defined course on the work-piece and the present application in part forms a continuation of my application, Serial No. 593,468, filed February 17, 1932, since matured into Patent No. 1,978,042, dated October 23, 1934.

It is an object of the present invention to provide in an apparatus of this kind, a means for raising and lowering the welding head together with a flexible wire guide and particularly in effecting this raising and lowering action by means of a rheostat.

Another object of the invention is the provision of a mounting whereby the entire mechanism may be raised and lowered as a unit so as to accommodate the mechanism for use on work-pieces of various heights.

Another object of the invention is the provision in an apparatus of this class, of a means of raising and lowering the wire guide tube automatically as the tool passes over the surface of the work-piece.

Another object of the invention is the provision in a device of this kind of a flexible wire feed.

Another object of the invention is the provision in an apparatus of this class of a tracing wheel attachment which may be easily and quickly mounted on the device for tracing purposes.

Another object of the invention is the provision in an apparatus of this class, of a mechanism whereby the wire guide may be set at any desired degree of angularity of any work and the tool used directly centered relatively to the tube carrying the wire guide.

Another object of the invention is the provision in an apparatus of this class of means for adjusting the position of the quadrant which supports the tube.

Another object of the invention is the provision of feed rollers formed from yieldable material which will permit the rollers to accommodate themselves to variations in the surface of the templet on the guide piece on which they operate.

Another object of the invention is through the provision of yieldable feed rollers to eliminate chattering of the wire feed.

Other objects will appear hereinafter.

The invention consists in the combination and arrangement of parts hereinafter described and claimed.

The invention will be best understood by a reference to the accompanying drawings which form a part of this specification and in which, Fig. 1 is a top plan view of the invention with a part removed.

Fig. 3 is an end elevational view with a part broken away.

Fig. 8 is a sectional view taken on line 8—8 of Fig. 1.

Fig. 9 is a fragmentary side elevational view taken on line 9—9 of Fig. 2, slightly enlarged.

Fig. 10 is a fragmentary side elevational view showing a tracing wheel attached.

Fig. 11 is a view of Fig. 10 taken at right angles with a part shown in section.

Fig. 12 is an enlarged view taken on line 12—12 of Fig. 8.

Fig. 13 is a sectional view taken on line 13—13 of Fig. 12.

Fig. 14 is a fragmentary side elevational view showing the end of the adjusting screw illustrated in Fig. 12.

Figure 1:
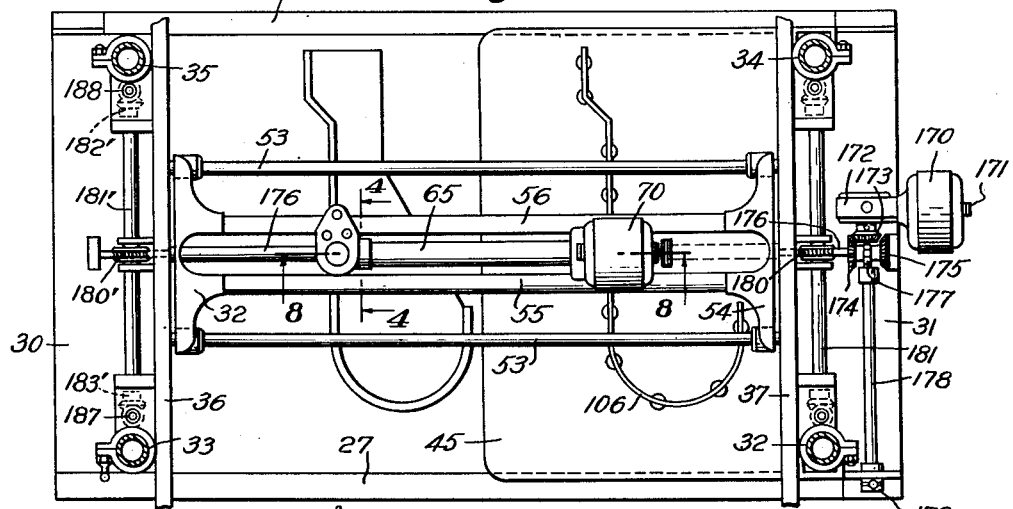

The invention comprises a base embodying channel-shaped side rails 27 and 28 connected at opposite ends by similar members 29, secured to which and projecting outwardly from the base thereof are plates 30 and 31. Secured to this bed or frame and projecting upwardly therefrom in rigid relation thereto at the corners thereof, are the supporting standards or posts 32, 33, 34, and 35. Extending transversely of the frame in opposite sides thereof are the plates 36 and 37 which are mounted on the sleeves 38 and 38'. Each of these sleeves embraces one of the posts in clamping relation and is provided with a suitable clamping arm 46. The sleeve 38 is connected by the channel iron 39 to the auxiliary sleeve 40 and the sleeve 38' is similarly connected to the auxiliary sleeve 40' by the channel or bar 39'. These sleeves 40 and 40' serve as guide sleeves to prevent cramping of the sleeves 38 and 38' on the posts 34 and 32 respectively. The plate 36 is similarly mounted on posts 33 and 35. Mounted on the sleeve 38 is a tubular nut 41, and a similar nut 41' is mounted on the sleeve 38'. The same arrangement prevails for the sleeves which are mounted on the posts 33 and 35. Threaded through the nut 41 is the screw rod 42 which is journalled at one end in the bearing 43 carried on the upper end of the post 34. A similar screw rod 42' is threaded through the nut 41' and journalled at its end in the bearing 43' mounted on the post 32. Similar nuts are carried by the sleeves on the posts 33 and 35. Carried by these sleeves 38 and 38' are supporting arms 44 which project outwardly and serve to support the bed or table 45. The plates 36 and 37 serve to form with the rails 47 and 49, tracks in which engage and ride rollers 50 and 51. These rollers are mounted on the shafts 53 which project at opposite sides through the cross heads 52 and 54. These cross heads are connected intermediate their ends by the spaced track forming channel-shaped members 55 and 56. These tracks 55 and 56 support at their lower ends the wear plates or ribs 57 and 58 on which ride the rollers 59 and 60, the roller 60 being provided with the V groove 61 on its periphery. These rollers are fixedly mounted on the shaft 62 which is journalled in the bearings 63 carried by the sleeve 64. This sleeve 64 is formed on and supported by the tube 65 through which extends the shaft 66. As clearly appears in Fig. 2 there are two sets of rollers 59 and 60, one at each end of the tube 65.

The shaft 66 extends into a housing 67 and carries on its inner end a bevel gear 68. Mounted on the housing 67 is a gear housing 69 which supports an electric motor 70. A pulley 71 driven by this motor serves, through the belt 72, to drive the pulley 73 which is mounted on the shaft 74 which extends into the housing 69 and serves, through a proper gearing, to drive the shaft 75. This shaft 75 carries a bevel gear 76 which meshes with the gear 77 and serves to rotate the same. The gear 77 is fixedly mounted on the shaft 78 which extends through the sleeve housing 79 and is journalled in bearings 80 and 81. This sleeve housing 79 is mounted on, and preferably formed integral with the housing 82. Fixedly mounted on the shaft 78 within the housing is a bevel gear 83 meshing with the link gear 84 of a differential construction which serves through the intermediary of the gears 85, 86, 87, 88, 89, 90, 91, 92, 93, and 94 to rotate the holding tubes 95 and 96.

A sleeve 97 is formed on the housing 82 and projects outwardly from the end of the housing 67. Fixedly mounted by means of the screw 99 on this sleeve is a cup-shaped retainer 98. Rotatably mounted on this cup-shaped retainer and projecting thereinto are shafts 101 and 102 each of which is projected into one of the sleeves 95 or 96 and rotatable in unison therewith by means of a key and slot arrangement. Mounted on each of the shafts 101 and 102 is a feed roller. This feed roller comprises a pair of disks or collars 103 and 104 between which is positioned the layer 105 of rubber or other suitable yieldable material. These rollers are adapted to engage opposite faces of the templet or guide plate 106 which is mounted on the table 45.

It is believed obvious that when the motor 70 is set to operation, the rollers will be rotated to serve as means for causing the housing 67 and associated parts to travel through the mountings of the carriage which comprises the heads 52 and 54 and the tracks 55 and 56 on the transversely extending tracks, a transverse movement of the carriage becomes possible. Through the mounting of the tube 65 and its associated parts on the tracks 55 and 56 a longitudinal movement of the mechanism is possible. Through this mounting the mechanism driven by the rollers will travel along the templet 106 so as to carry with it the metal working tool. Due to the formation of the rollers from yieldable material projections and imperfections on the templet 106 will be compensated for a smooth operation and a chattering or vibration in the working tool eliminated. Furthermore, the operation of the mechanism is rendered less noisy. The slight flattening of the rollers will also tend to prevent any rotation of the housing 82 except that rotation which is determined by the templet 106.

The shaft 66 also projects into a housing 107 and positioned within this housing and fixedly mounted on the shaft 66 is a bevel gear 110 meshing with a bevel gear 108 fixedly mounted on the tube 109. This tube 109 projects through the housing 107 and is axially fixed relatively to the housing 107. Fixedly mounted on the tube 109 is a housing 111 which is formed integral with the motor housing 112. Extending through the passageway formed in the tube 109 are wires 113, 114, and 115 which are connected to the rheostat terminals 116 mounted on the disk 117 and also to the contact arm 119 which is adapted to contact with these terminals 116 and which is pivotally mounted at 120 in such a manner that the motor 112 may be controlled by a rocking of the arm 119 through the medium of the rod 121 and the rockably mounted lever 122 which is pivotally mounted on the lower end of the arm 122' which projects downwardly from the enclosing casing 118. A roller 123 is carried on one end of the lever 122 and a spring 124 serves to maintain the roller 123 in contact with the surface over which it is passed. Driven by the shaft 126' of the motor 112 is a gear 126 which is internally threaded and through which projects a tube 127 which is threaded at its upper end with the threads 125. Extending through this tube 127 is the guide sheathing 129 through which is passed welding wire 133. This wire is fed by the rollers 131 and 132 which are carried on the automatic welding head 130. The tube 127 is welded or otherwise suitably secured to this head 130.

The lower end of the tube 127 is cut away as at 128 on one side through which cut-away portion the sheathing 129 may be extended. Positioned on the lower end of the tube 127 in telescoping relation is a supporting sleeve 134 which is also cut away to provide an outlet for the sheathing 129. This supporting sleeve 134 is provided with the elongated slot 135 through which extends the set screw 136 which threads into the tube 127, and serves as a means for securing the sleeve 134 on the tube 127.

Supported by the sleeve 134 are the arcuate quadrant arms 137 each of which is provided with the arcuate slot 138. This sleeve also serves as a support for the rheostat construction embodying the disk 117, the housing 118 and the supporting arm 122'. Mounted on the arms 137 by means of the set screws 140 is a mounting block 139 for the welding tip 142 which is locked in position by the lock nut 143.

In the construction shown in Fig. 12 I have illustrated a method for adjusting the roller shafts 101 and 102 relatively to each other. These shafts project through bearing blocks 146 and 147 which are slidably mounted in the slot 148 formed in the base of the member 98. Each of these bearings is provided with a lug 151 through which extends a threaded screw having the flat faced end 150 resting in the cutaway portion or socket 149. The construction is such that upon a turning of the screw 152 the bearings 146 and 147 may be moved relatively to each other.

In the form shown in Fig. 10 and Fig. 11 I mount a retainer 154 on the member 98 and projecting downwardly from this retainer are lugs 155 through which are threaded the set screws 156 which are adapted to engage the pointed boss 157, extending outwardly from the opposite face of the tracing wheel 158.

Figure 2:
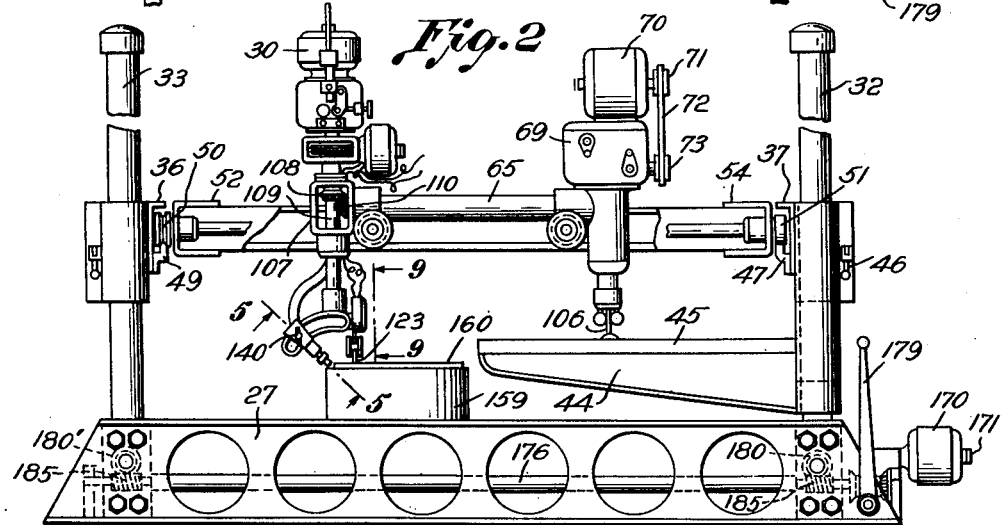
Fig. 2 is a side elevational view with a part broken away.
Figure 4:
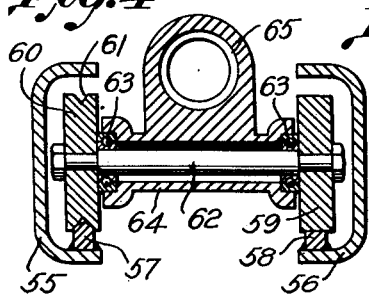
Fig. 4 is a sectional view taken on line 4—4 of Fig. 1.
Figure 5:
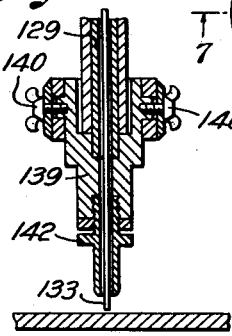
Fig. 5 is a fragmentary sectional view taken on line 5—5 of Fig. 2.
Figures 6, 7:
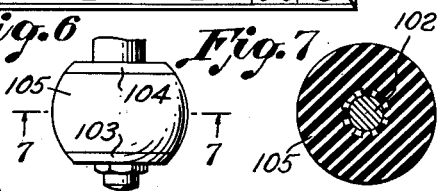
Fig. 6 is a side elevational view of one of the feed rollers.
Fig. 7 is a view taken on line 7—7 of Fig. 6.

In Fig. 2 I have shown the device operating upon a cylindrical body 159. The welding point 133 is in engagement with the edge of this body 159 for welding a cover or bottom thereon. It will be noted that the roller 123 is in contact with the upper surface of this cover 160 and that the welding point is so supported on the quadrant arms 137 as to project angularly to the edge at which the weld is to be made. The templet 106 positioned on the bed 45 would of course be formed the same shape as the contour of the bottom 160. When the motor 70 is set into operation the feed rollers would carry the mechanism mounted on the tracks so that the welding point would travel around the bottom 160.

In Fig. 8 I have shown the welding point 133 engaging in a corner formed by the juncture of the work-pieces 161 and 162. It will be noted that the angularity of the welding point is maintained during the entire operation. Should the roller 123 be passing over an uneven surface on the work-piece 163 as shown in Fig. 9 the oscillation or rocking of the member 119 will effect an operation of the motor 112 thus causing the tube 127 to move upwardly and downwardly so as to maintain the welding point in proper contact with the work-piece operated upon. The flexible sheathing 129 moves upwardly and downwardly and due to the fact that this is flexible this angularity may be maintained. The raising and lowering of the guide tube is automatic. It is obvious that by loosening the set screws 140 the angularity of the electrode or wire 133 relative to the work-piece may be adjusted to any desired degree within the range of the quadrant supporting arms 137.

By means of the adjustment of the bearings 146 and 147 the roller may also be easily and quickly adjusted to templets of various thicknesses.

When it is desired to use the device for tracing purposes, the tracing wheel 158 may be quickly placed in position and the device also used for tracing purposes.

When the motor 170 is set into operation the entire structure including the tracks and table may be raised or lowered as desired. The shaft 171 of the motor 170 extends into a gear box 172 and serves to drive the bevel gear 173. This bevel gear 173 is adapted to mesh with either the bevel gear 174 or the gear 175, both of which are slidably mounted on the shaft 176 and rotate in unison therewith. A yoke 177 may be rocked by means of the shaft 178 and the handle 179 to bring either of the gears 174 or 175 into mesh with the gear 173 and thus effecting a rotation of the shaft 176 in one direction or the other. This shaft 176 is provided with a worm 185 at each end which serves to drive the worm wheels 180 and 180' which are fixedly mounted on the shafts 181 and 181'. The shafts 181 and 181' carry at their opposite ends the bevel gears 182, 183, 182' and 183' each of which meshes with a gear 184 fixedly mounted on the members 42, 42', 187 and 188, so that when shaft 176 is rotated, it will rotate shafts 181 and 181' in a like manner, causing screw shafts 42, 42', 187 and 188 to rotate in unison. Consequently it is seen that by operation of the motor 170 the tracks and the bed 45 may be raised and lowered so as to accomodate the device for operation on work-pieces of various sizes and heights.

While I have illustrated and described the preferred form of construction I do not wish to limit myself to the precise details of structure shown but desire to avail myself of such variations and modifications as may come within the scope of the apended claims.

Having thus described my invention what I claim as new and desire to secure by Letters Patent is:

1. In a device of the class described the combination of a thermal metal working instrumentality; a freely movable tracking mechanism for supporting said instrumentality; a templet for defining the line of operation of said instrumentality; a flexible guide for said instrumentality; means for maintaining said instrumentality at an angle to the work-piece operated upon; and power driven means for raising and lowering said instrumentality in conformance with the surface of the work-piece independently of the raising and lowering of the supporting means of said instrumentality.

2. In a device of the class described the combination of a thermal metal working member; supporting means for said member; means for maintaining said member inclined angularly to the work-piece operated upon; and power driven means for raising and lowering said member in conformance with the contour of the surface of the work-piece operated upon independently of the movement of said supporting means and without disturbing the angle of inclination of said member.

3. In a device of the class described the combination of a thermal metal working member; a templet for defining the line of operation of said member; power means for driving said member along the line of operation; means for maintaining said member inclined to the line of operation; and power driven means for raising and lowering said member in conformance with the contour of the surface of the workpiece operated upon independent of and without interfering with the operation of said driving means.

4. In a device of the class described the combination of a supporting frame; longitudinally extending tracks on said frame; transversely extending tracks on said frame; a thermal metal working member; means mounted on said tracks and movable longitudinally and transversely of said frame for supporting said member; a templet supporting table; a templet on said table for determining the line of movement of said member; adjustable means for securing said member at an angle of inclination to the line of operation; means for maintaining said member at said angle during the movement of the same along the line of operation; and means for raising and lowering said member during its movement without affecting the angle of inclination.

5. In a device of the class described: the combination of a thermal metal working member; means for supporting said member; a templet supporting table; a templet mounted on said table; a mechanism engageable with and moveable around said templet; power driven means for moving said mechanism around said templet; means connecting said mechanism with said supporting means for moving in unison with and in the same path as the path of travel of said mechanism; and power driven means moveable upwardly and downwardly during the travel of said mechanism around said templet without interfering with the corresponding movement of said supporting means for effecting a raising and lowering of said member.

6. In a device of the class described: the combination of a thermal metal working member; means for supporting said member; a templet supporting table; a templet mounted on said table; a mechanism engageable with and moveable around said templet; power driven means for moving said mechanism around said templet; means connecting said mechanism with said supporting means for moving in unison with and in the same path as the path of travel of said mechanism; power driven means moveable upwardly and downwardly during the travel of said mechanism around said templet without interfering with the corresponding movement of said supporting means for effecting a raising and lowering of said member; and means engageable with a work piece for controlling said last named power driven means.

7. In a device of the class described: a supporting frame; longitudinally extending tracks on said frame; transversely extending tracks on said frame; a thermal metal working member; means mounted on said tracks and moveable longitudinally and transversely of said frame for supporting said member; a templet supporting table; a templet on said table; a mechanism engageable with said templet adapted upon operation for driving said supporting means relatively to said table to conform to the outline of said templet; power driven means for operating said mechanism; means for raising and lowering said metal working member during its movement in response to the action of said mechanism; and means engageable with the surface of a work piece operated upon for controlling said raising and lowering means.

8. In a device of the class described, a thermal metal working member; a flexible guide tube for said member, said member projecting at one end through said guide tube and extending beyond the same; means engaging the end of said guide tube and movable into various positions for adjusting the angularity of said metal working member relatively to a work piece; means for locking said engaging means in various positions of movement for maintaining a fixed angularity of adjustment; and power driven means for raising and lowering said guide tube and said metal working member in unison with each other without affecting the adjusted angularity.

PAUL E. DODGE.